Oct. 18, 1960 R. F. COTELLESSA ET AL 2,957,147
DEVICE FOR AUTOMATICALLY MEASURING AMPLITUDE MODULATION FACTOR
Filed June 11, 1958
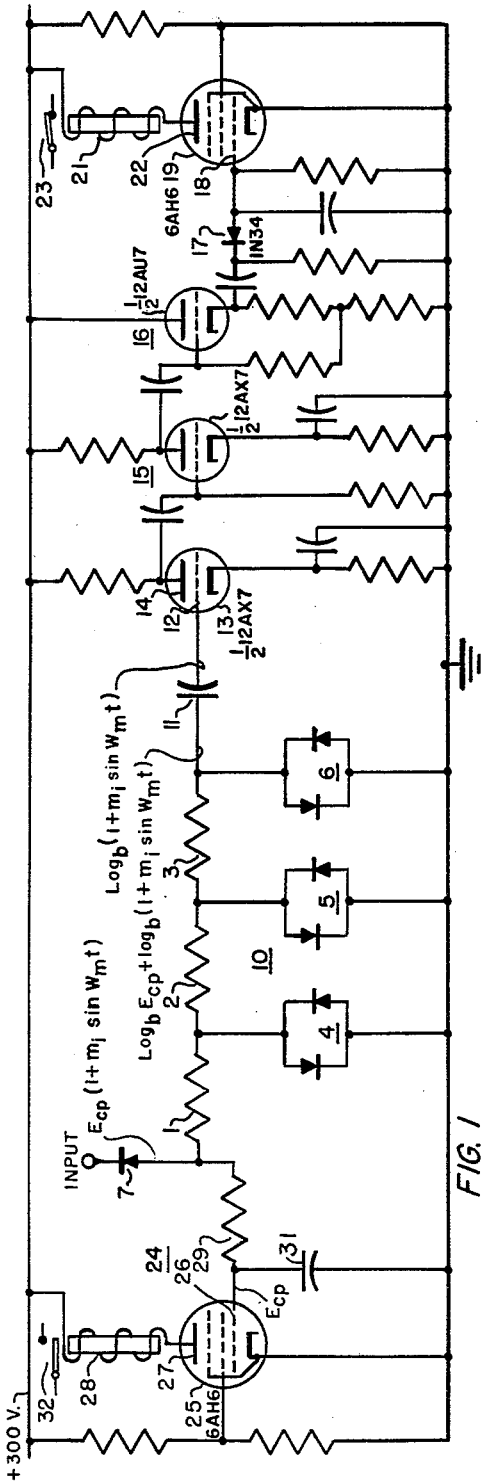
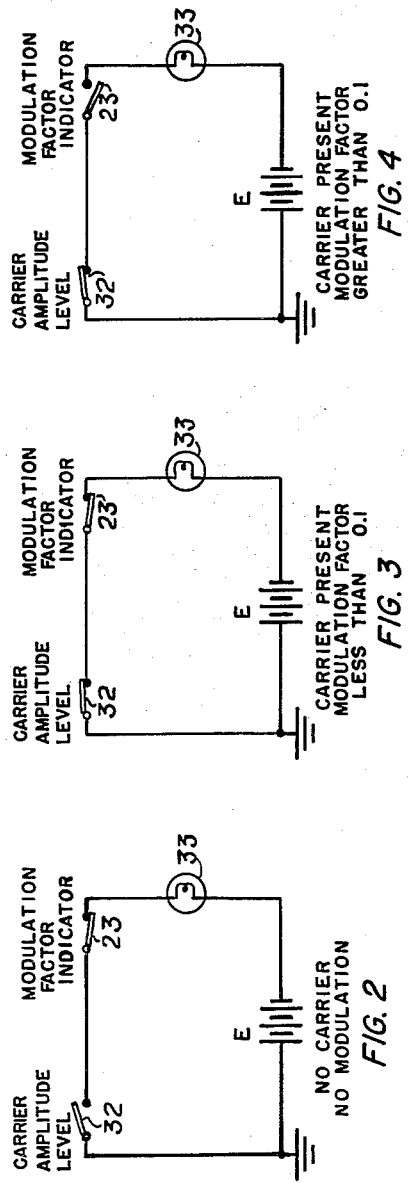
INVENTORS,
ROBERT F. COTELLESSA,
LESTER J. SAPORTA &
ELIAS T. SCHUTZMAN.
BY
Harry M. Saragovitz
ATTORNEY.

United States Patent Office 2,957,147
Patented Oct. 18, 1960

2,957,147
DEVICE FOR AUTOMATICALLY MEASURING AMPLITUDE MODULATION FACTOR

Robert F. Cotellessa, Glen Rock, N.J., and Lester Jack Saporta, New York, and Elias T. Schutzman, Flushing, N.Y., assignors to the United States of America as represented by the Secretary of the Army Filed June 11, 1958, Ser. No. 742,465

6 Claims. (Cl. 332—39)

The present invention relates to a device for automatically measuring the amplitude modulation factor of an amplitude-modulated signal, and more particularly to such a device incorporating an auxiliary stage to allow the device to differentiate between no-signal condition and signal condition.

The term modulation factor as used herein is synonymous with the terms degree or percentage modulation and can be defined as:

$$m_1 \equiv \frac{E_m}{E_c} \quad (1)$$

where $m_1$ is modulation factor, $E_m$ is the peak value of the modulation voltage and $E_c$ is the peak value of the carrier voltage.

An object of the present invention is to provide a novel, simple, and efficient electrical circuit for indicating the modulation factor of an amplitude-modulated signal.

Another object of the present invention is to provide an electrical circuit for indicating when a signal with modulation factor of 0.10 or less is received.

A still further object of the present invention is to provide a circuit for detecting modulating factors within specific values.

In the present invention a direct current (D.-C.) voltage equal to the carrier amplitude level of an amplitude-modulated signal is applied to the input of a logarithmic circuit element, together with the alternating current (A.-C.) components of the detected modulation of the amplitude-modulated signal. The logarithmic circuit element is a passive network composed of resistors and rectifiers which provides an output voltage proportional to the logarithm of the input voltage. One example of such a logarithmic circuit element is a "Logaten," which is a non-linear attenuating network whose output voltage is a linear function of the logarithm of the input voltage amplitude. The "Logaten" was manufactured by Kay Lab, a company now known as Kin Tel, a division of Cohu Electronics, Inc. of San Diego, California. Another example of a similar logarithmic network is disclosed in Figures 2 and 9 of Patent 2,104,336, W. N. Tuttle, January 4, 1938. The A.-C. component of the logarithmic circuit element output voltage, which is proportional to the modulation factor, is amplified, peak detected and is used to control the contacts of a first relay. A portion of the D.-C. voltage proportional to the carrier amplitude level of the amplitude-modulated signal is used to control the operation of a second relay which has its contacts connected in series with the contacts of the first relay. The two relays are so controlled that when the modulation-factor of the received signal is between 0 and 0.10 both relay contacts will be closed and an indicator lamp will be lighted.

The exact nature of this invention, as well as other objects and advantages thereof, will be readily apparent from consideration of the following specification relating to the annexed drawings in which:

Figure 1 is a schematic diagram of the preferred embodiment of the invention; and Figures 2, 3, and 4 show the circuit including the relay contacts in their respective settings for conditions of no carrier—no modulation voltage, carrier present—modulation factor less than 0.10, and carrier present-modulation factor greater than 0.10.

Referring now the the drawings, there is shown in Figure 1 a modulation indicating system wherein a "Logaten" 10, the preferred logarithmic element, comprises resistors 1, 2 and 3 connected in series, and three pairs of rectifiers 4, 5, and 6, each having the two rectifiers thereof connected in parallel but in reverse relationship, in order that logarithmic operation will occur on both halves of the A.-C. input signal. Each of the pairs of rectifiers has an end connected to ground. The other ends of the pairs of rectifiers 4, 5 and 6 are connected to the junction of resistors 1 and 2, the junction of resistors 2 and 3 and to the extremity of resistor 3, respectively.

Connected to the extremity of resistor 1 is a detector 7 for applying to "Logaten" 10 a D.-C. voltage equal to the carrier amplitude level of the amplitude-modulated signal, together with the alternating (A.-C.) component of the detected modulation of the amplitude-modulated signal. This signal information, as applied to the input of the "Logaten" 10, can be represented mathematically as follows:

$$E_{in} = E_{cp}(1 + m_1 \sin w_m t) \quad (2)$$

where only a single modulation frequency is considered, for the sake of simplicity. Here $E_{cp}$ represents the D.-C. voltage equal to the carrier peak voltage ($E_c$) as used in Equation 1 above, and $w_m$ represents the modulation frequency. The output of the "Logaten" 10, which is the logarithm of the input applied thereto and which is taken from the junction of resistor 3 and rectifier pair 6 and applied to D.-C. blocking condenser 11, is therefore given by:

$$E_{out} = \log E_{in}$$
$$= \log_b E_{cp} + \log_b (1 + m_1 \sin w_m t) \quad (3)$$

where $b$ is the base of the "Logaten" characteristic. The A.-C. component of the output of the "Logaten," represented by the expression $\log_b (1 + m_1 \sin w_m t)$, is applied through D.-C. blocking condenser 11 to grid 12 of amplifier tube 13. Since the D.-C. component of this output, represented by the expression $\log_b E_{cp}$, is blocked by condenser 11, the value of the A.-C. component is proportional to the modulation factor, and is not altered by a change in the carrier amplitude level as long as the modulation factor ($m_1$) is constant. The A.-C. component of the output voltage is amplified by amplifier tube 13 and applied from plate 14 thereof through two further amplifier stages 15 and 16, respectively, to a peak detector 17. In the preferred embodiment this peak detector is a germanium rectifier such as IN34. Peak detector 17 detects only the negative cycles of the voltage applied thereto from amplifying stage 16. This negative peak detected voltage is then applied as a bias to control grid 18 of sharp cut off pentode 19. A modulation factor indicator relay coil 21 is connected between a 300 volt D.-C. source and plate 22 of pentode 19 and behaves as a plate load therefor. Pentode 19 normally conducts heavily so that relay 21 is energized, and keeps contacts 23 closed. Upon application of a sufficient negative voltage from peak detector 17 to control grid 18, the plate current of pentode 19 is reduced until the relay becomes de-energized. The amplication provided is such that relay 21 does not become de-energized unless a signal is received having a modulation factor of 0.10 or greater. This is done since it is desired to identify only modulation factors of 0.10 or less. This system, including the "Logaten" 10, blocking condenser 11, amplifier stages 15 and 16, sharp cut off pentode 19, and relay 21, will be referred to hereafter as a measuring circuit.

The system described above allows relay contacts 23 to remain in their normally closed state both when no signal is received and when a signal having a modulation factor of 0.10 or less is received. An auxiliary stage 24 is used to enable differentiation between signal and no signal conditions and comprises a sharp cutoff pentode 25 having a control grid 26 and plate 27 and a carrier amplitude level relay 28. Relay 28 is connected between a 300 volt D.-C. source and plate 27. Control grid 26 is connected through resistor 29 to the input of "Logaten" 10. A by-pass capacitor 31 is connected between control grid 26 and ground. Simultaneously with the information applied to "Logaten" 10, a portion of the D.-C. voltage derived from the carrier is applied from the input of "Logaten" 10 to control grid 26 and is used as the control voltage for sharp cutoff pentode 25. Carrier relay 28 controls relay contacts 32 which are normally open. Pentode 25 is normally conducting and so relay 28 is normally energized. When a signal is received, the D.-C. voltage derived from the carrier is applied as a negative voltage to control grid 26 of pentode 25, causing pentode 25 to stop conducting (cut off), and relay 28 to de-energize, permitting relay contacts 32 to close.

Relay contacts 23 and 32 are connected in series with a D.-C. voltage source (battery) E and an indicating means, preferably lamp 33, as shown in Figures 2 through 4. As shown in Figure 2, when no signal is being received (no carrier and no modulation exist), contacts 32, controlled by carrier-amplitude level relay 28, remain in their normally open condition since pentode 25 is conducting; and contacts 23, controlled by modulation-factor indicator relay 21, remain in their normally closed condition since pentode 19 is conducting. Lamp 33 is therefore off since contacts 32 of the circuit are open.

When a signal having a modulation factor less than 0.10 is received, pentode 25 is cut-off by the negative D.-C. carrier applied thereto and contacts 32 close (Figure 3). Contacts 23 remain closed since the voltage proportional to the modulation factor which is applied to grid 13 of pentode 19 is not enough to cut it off. Lamp 33 now lights and indicates that the signal being received has a modulation factor of 0.10 or less.

When a signal is received having a modulation factor greater than 0.10, the voltage which is proportional to the modulation factor, and which is applied to control grid 18, is high enough to cut-off pentode 19 and therefore de-energize modulation factor indicator relay 21 to open relay contacts 23. The negative D.-C. carrier voltage applied to grid 26 cuts off pentode 25 to de-energize relay 28 and to close contacts 32. Thus lamp 33 is not lighted since, as shown in Figure 4, the carrier amplitude level contacts 32 are closed and the modulation factor indicator level contacts 23 are open.

As the foregoing disclosure relates to a preferred embodiment only of the invention, numerous modifications or alteration may be made therein without departing from the spirit and the scope of the invention as set forth in the appended claims.

What is claimed is:

1. A device for measuring the amplitude modulation factor of a modulated signal comprising a non-linear circuit having a characteristic such that the output voltage therefrom is proportional to the logarithm of the input voltage applied thereto, said non-linear circuit comprising passive circuit elements and having an input circuit and an output circuit; coupling means connected to said input circuit for applying electrical information thereto, said information being a D.-C. voltage proportional to the carrier amplitude level of said modulated signal and A.-C. modulation components of said modulated signal after detection thereof; means for indicating the value of the modulation factor; and a blocking condenser connected between said output circuit and said means, said condenser receiving the output voltage from said output circuit and passing only the A.-C. portion thereof to said means.

2. An apparatus for measuring the amplitude modulation factor of a modulated signal comprising a non-linear attenuating network whose output voltage is a linear function of the logarithm of the input voltage applied thereto, means for applying to said non-linear network a D.-C. voltage proportional to the carrier amplitude level of said modulated signal and A.-C. modulation components of said modulated signal after detection thereof; an amplifier; a blocking condenser connected between said non-linear network and said amplifier to receive the output from said non-linear network and to pass the A.-C. portion therefrom to said amplifier; a sharp cut-off pentode tube; a rectifier connected between said amplifier and said sharp cut-off pentode; and a modulation-factor indicator relay connected to said sharp cut-off pentode.

3. The apparatus of claim 2 further comprising another sharp cut-off pentode connected to receive a portion of the D.-C. input applied to said non-linear network, a carrier amplitude level relay connected to said other pentode, said modulation factor indicator relay and said carrier amplitude level relay each having electrical contacts; a D.-C. source of voltages and an indicating lamp, said contacts of said modulation-factor indicator relay and said carrier amplitude level relay being connected in series with said D.-C. source of voltage and said indicating lamp.

4. An apparatus for measuring the amplitude modulation factor of a modulated signal comprising a non-linear attenuating network whose output voltage is a linear function of the logarithm of its input voltage; means connected to said non-linear attenuating network for applying thereto a D.-C. voltage equal to the carrier amplitude level of said modulated signal and A.-C. modulation components of said modulated signal after detection thereof; an amplifier; a blocking condenser connected between said non-linear attenuating network and said amplifier for passing the A.-C. portion of said output voltage from said non-linear network; a sharp cut-off pentode tube having a control grid and a plate; a peak-detector connected between said amplifier and said control grid for detecting the negative cycles of the output voltage of said amplifier; a D.-C. plate voltage source; a modulation-factor indicator relay connected between said plate and said D.-C. plate voltage source, said modulation-factor indicator relay having electrical contacts; an indicating circuit connected to said contacts, said pentode being normally conducting so that said modulation-factor indicator relay is energized and said contacts are kept closed, whereby when said pentode has a sufficiently negative voltage applied to said grid, said pentode cuts off, de-energizing said modulation-factor indicator relay and opening said contacts.

5. The apparatus of claim 4 further comprising another sharp cut-off pentode having a control grid and a plate; said control grid of said other pentode being connected to said means to receive therefrom a portion of said D.-C. voltage equal to the carrier amplitude level of said modulated signal; a carrier amplitude level relay connected between said D.-C. plate voltage source and said plate of said other pentode, said carrier amplitude level relay having electrical contacts connected to said indicating circuit, said other pentode being normally conducting so that said carrier amplitude level relay is energized and said carrier amplitude level relay contacts are kept open, whereby when a sufficiently negative voltage is applied to said grid of said other pentode, said other pentode cuts off, de-energizing said carrier amplitude level relay and closing said carrier amplitude level relay contacts.

6. The apparatus of claim 5 wherein said indicating circuit comprises a lamp and a battery connected in series, said contacts of said modulation-factor relay and said contacts of said carrier amplitude level relay being connected in series with said lamp and said battery and forming a closed circuit therewith, whereby said lamp is lighted when said contacts of said modulation-factor relay and said contacts of said carrier amplitude level relay are both in closed condition.

References Cited in the file of this patent

Watkins: "Speech Compressor and Modulation Monitor," Radio and Television News, pages 40–43, Jan. 1951.

G. Epprecht: Bern "A New Type Instantaneous Logarithmic Wide-Band Amplifier," PB–121485, May 1955, 7 pages.

Keister: "The Design of Switching Circuits," D. Van Nostrand Co., 1951, pages 36–37.